(12) United States Patent
Shi et al.

(10) Patent No.: US 7,495,900 B2
(45) Date of Patent: Feb. 24, 2009

(54) PROTECTION MECHANISM FOR CONNECTORS

(75) Inventors: Shu-Gang Shi, Guangdong (CN); Yu Huang, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 263 days.

(21) Appl. No.: 11/306,452

(22) Filed: Dec. 29, 2005

(65) Prior Publication Data

US 2006/0279918 A1    Dec. 14, 2006

(30) Foreign Application Priority Data

Jun. 10, 2005    (CN)    ............ 2005 2 0059970.5

(51) Int. Cl.
*G06F 1/16*    (2006.01)

(52) U.S. Cl. ............ 361/683; 361/725; 361/726; 312/223.2; 312/324

(58) Field of Classification Search ........... 361/683, 361/686, 726, 747, 687; 312/223.2, 324; 312/265.6, 244, 292; 49/367; 62/277
See application file for complete search history.

(56) References Cited

U.S. PATENT DOCUMENTS

| | | | | |
|---|---|---|---|---|
| 789,800 A * | 5/1905 | Doherty | ............ | 312/239 |
| 1,769,541 A * | 7/1930 | Parcell | ............ | 312/205 |
| 1,790,130 A * | 1/1931 | Austin | ............ | 312/222 |
| 1,893,747 A * | 1/1933 | Kennedy | ............ | 312/266 |
| 2,034,472 A * | 3/1936 | Kesslinger | ............ | 220/522 |
| 2,449,384 A * | 9/1948 | Hursey et al. | ............ | 62/277 |
| 2,519,490 A * | 8/1950 | Miller | ............ | 312/244 |
| 2,629,644 A * | 2/1953 | Heys | ............ | 312/286 |
| 2,708,524 A * | 5/1955 | Kerr | ............ | 108/25 |
| 2,994,453 A * | 8/1961 | Gardiner | ............ | 220/825 |
| 4,984,982 A | 1/1991 | Brownlie et al. | | |
| 5,007,569 A * | 4/1991 | Zarb | ............ | 224/275 |
| 5,020,684 A * | 6/1991 | Jow | ............ | 220/4.24 |
| 5,061,022 A * | 10/1991 | Meriwether | ............ | 312/324 |
| 5,111,956 A * | 5/1992 | Jow | ............ | 220/811 |
| 5,116,261 A * | 5/1992 | Lan et al. | ............ | 312/262 |
| 5,769,646 A | 6/1998 | Cavello et al. | | |
| 5,785,399 A * | 7/1998 | Frankeny et al. | ............ | 312/324 |
| 5,931,550 A * | 8/1999 | Chen | ............ | 312/244 |
| 6,130,822 A * | 10/2000 | Della Fiora et al. | ......... | 361/724 |
| 6,134,116 A * | 10/2000 | Hoss et al. | ............ | 361/747 |
| 6,246,572 B1 * | 6/2001 | Myers et al. | ............ | 361/683 |
| 6,494,070 B1 * | 12/2002 | Moss et al. | ............ | 70/423 |
| 6,603,655 B2 * | 8/2003 | Hrehor et al. | ............ | 361/683 |
| 6,648,349 B1 * | 11/2003 | Waller et al. | ............ | 280/47.35 |
| 6,721,179 B2 * | 4/2004 | Song et al. | ............ | 361/690 |
| 6,873,523 B2 * | 3/2005 | Shyr | ............ | 361/683 |
| 7,307,832 B1 * | 12/2007 | Lewis | ............ | 361/679 |
| 2002/0041484 A1 * | 4/2002 | Lajara et al. | ............ | 361/687 |
| 2004/0001313 A1 * | 1/2004 | Yoshikara | ............ | 361/687 |

* cited by examiner

*Primary Examiner*—Anatoly Vortman
*Assistant Examiner*—Quinn Hunter
(74) *Attorney, Agent, or Firm*—Winston Hsu

(57) ABSTRACT

A protection mechanism in accordance with a preferred embodiment of the present invention includes a bracket for being secured to a rear portion of a computer chassis, and first and second covers respectively pivotally attached to the bracket. Adjacent sides of the first and second covers each form a lug. The lug of the first cover abuts against the lug of the second cover so as to prevent the second cover from rotating.

3 Claims, 4 Drawing Sheets

PROTECTION MECHANISM FOR CONNECTORS

CROSS-REFERENCES TO RELATED APPLICATION

Relevant subject matter is disclosed in the copending U.S. patent application Ser. No. 11/156,518, filed on Jun. 20, 2005, and entitled "PROTECTION DEVICE FOR CONNECTORS"; and the copending U.S. patent application Ser. No. 11/306,454, filed on the same date and having a same title with the present application, which are assigned to the same assignee as this patent application.

FIELD OF THE INVENTION

The present invention relates to a protection mechanism for connectors connected to a computer.

DESCRIPTION OF RELATED ART

Developments in networks and a great diversity of computer performances have resulted in more and more input/output interfaces disposed at a computer chassis. A typical computer chassis includes a plurality of connectors connected with cables. These cables include a power cable, a signal cable connecting a monitor, a mouse cable, a keyboard cable, a network cable, a microphone cord, and an earphone cord, etc. These cables are often in a mess at a rear panel of a computer, thereby resulting inconvenient during assembling or disassembling the computer.

In addition, the connectors at the rear panel are exposed in the air. Dust is often accumulated thereby affecting signal transfer. Furthermore, the connectors connected to the rear panel of the computer chassis are susceptible to being broken of or inadvertently disconnected because the connectors typically extend outwardly from the rear panel a substantial distance.

What is desired, therefore, is to provide a protection mechanism for protecting connectors of a computer from contamination or being damaged.

SUMMARY OF INVENTION

In one preferred embodiment, a protection mechanism includes a bracket for being secured to a rear portion of a computer chassis, and first and second covers respectively pivotally attached to the bracket. Adjacent sides of the first and second covers each form a lug. The lug of the first cover abuts against the lug of the second cover so as to prevent the second cover from rotating.

The protection mechanism further includes a lock to lock the first cover to the bracket.

When the second cover is closed, a free end of the second cover abuts against a side of a side panel of the computer chassis to prevent the side panel from withdrawal.

In this preferred embodiment, the side panel can be disassembled only when the second cover is opened, and the second cover can be opened only when the first cover is opened. Thus, only one lock can control the two covers and the side panel.

Other advantages and novel features will become more apparent from the following detailed description of preferred embodiments when taken in conjunction with the accompanying drawings, in which:

DETAILED DESCRIPTION

Figure 1:
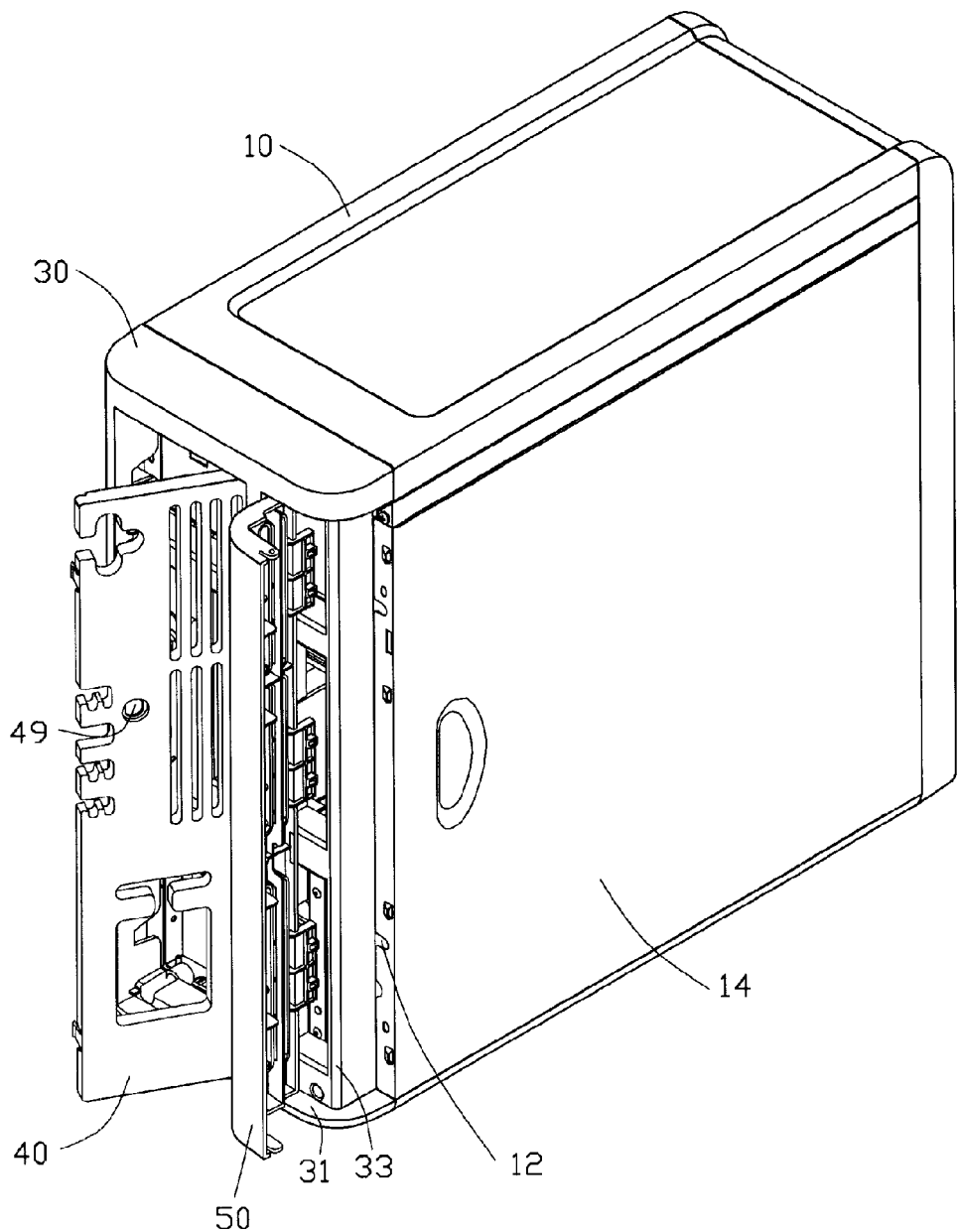
FIG. 1 is an isometric view of a protection mechanism in accordance with a preferred embodiment of the present invention, the protection mechanism being attached to a computer chassis, and including a bracket, a first cover, and a second cover.
Figure 2:
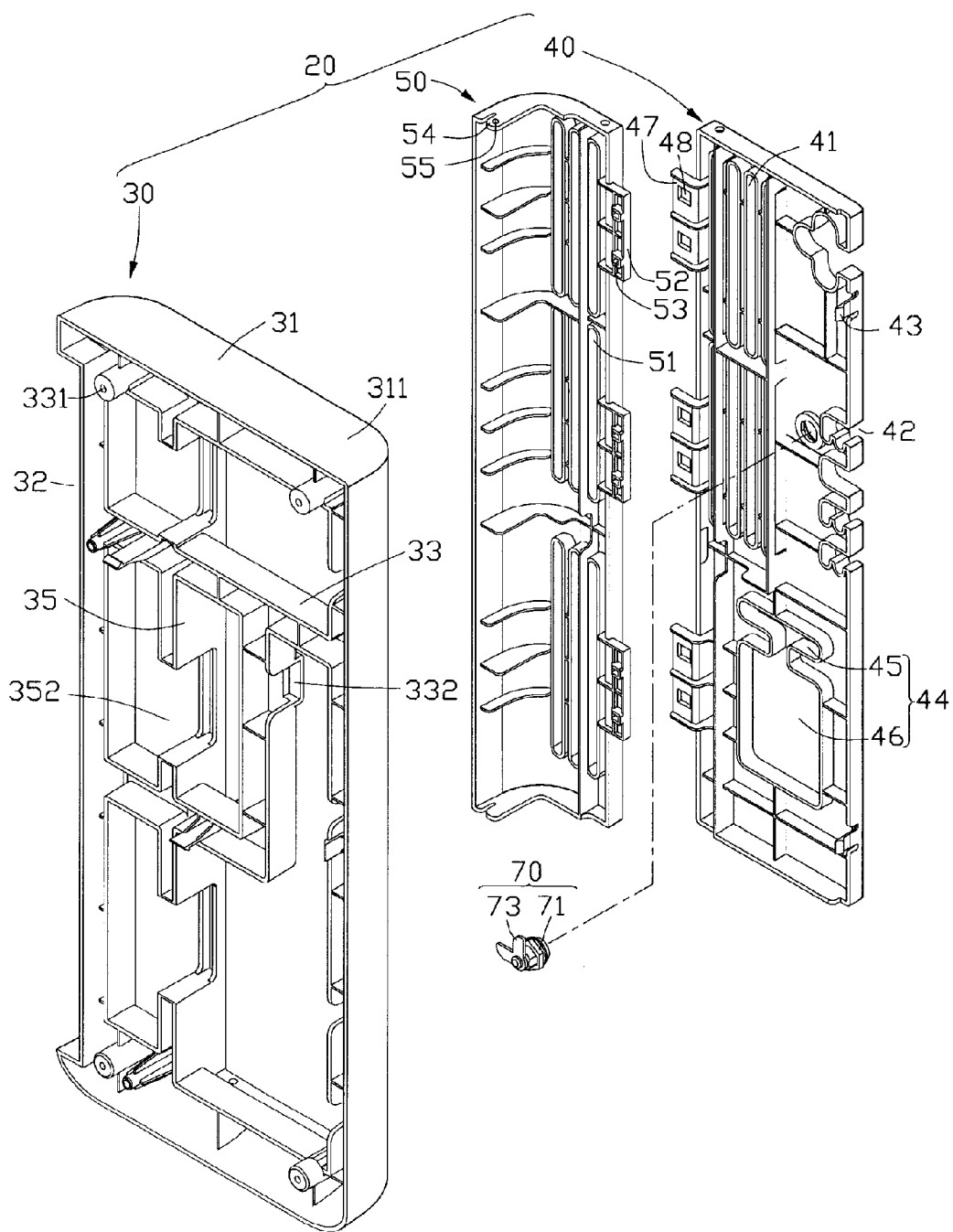
FIG. 2 is an explosive, isometric view of the protection mechanism of FIG. 1, but viewed from another aspect.

Referring to FIGS. 1 and 2, a protection mechanism 20 for connectors in accordance with a preferred embodiment of the present invention is to be attached to a rear portion of a computer chassis 10. The protection mechanism 20 includes a bracket 30, a first cover 40, a second cover 50, and a fastening device such as a lock 70. The computer chassis 10 includes a rear panel 12 for accommodating the connectors, and a side panel 14. The side panel 14 is slidably attached to the computer chassis 10 in a back-to-front direction. In another preferred embodiment, the side panel 14 is rotatably attached to the computer chassis 10 at a side near the rear panel 12.

The bracket 30 includes a U-shaped outer frame 31, and an inner frame 33. The outer frame 31 has a cutout 32 corresponding to the side panel 14 of the computer chassis 10. The outer frame 31 includes two arm portions 311, and a crossbeam 35 perpendicularly connecting the arm portions 311. The crossbeam 35 divides the outer frame 31 into two regions, one larger than the other. The first cover 40 is pivotally accommodated in the larger region, and the second cover 50 is pivotally accommodated in the smaller region. Pivot ends of the first and second covers 40, 50 are in the vicinity of the crossbeam 35. Three cutouts 352 are defined in an inner side of the crossbeam 35.

The inner frame 33 is recessedly formed between the arm portions 311 of the outer frame 31 for reinforcing the bracket 30. Four threaded holes 331 are defined in four corners of the inner frame 33, respectively. The bracket 30 is thereby secured to the rear panel 12 of the computer chassis 10 via screws. The inner frame 33 defines a plurality of openings in order not to shield the input/output interfaces. A locking portion 332 is formed at the inner frame 33 besides one of the openings.

Figure 3:
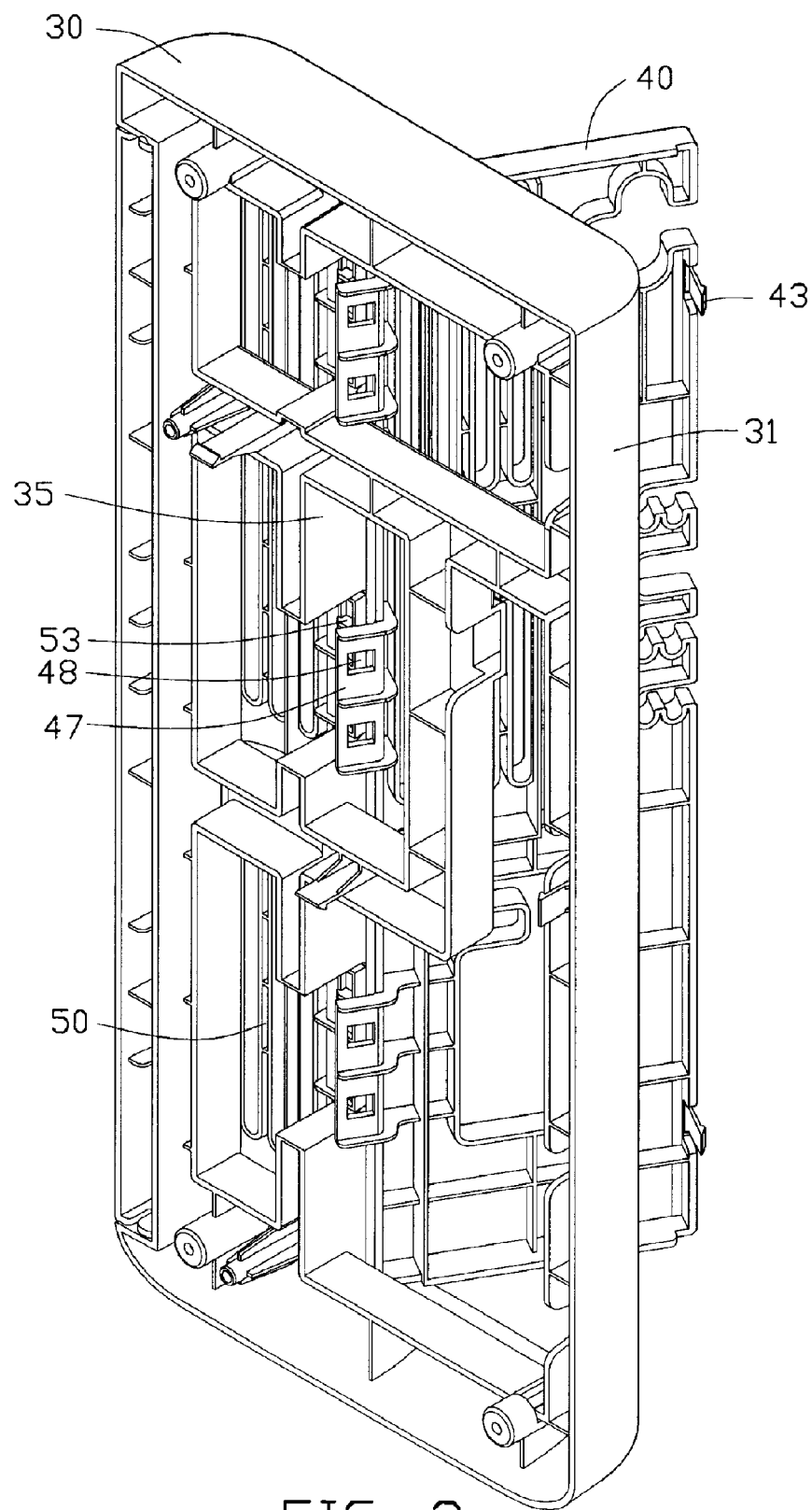
FIG. 3 is an assembled view of FIG. 2, showing an unlocked position.

Referring also to FIG. 3, the first cover 40 is rectangular, and defines a plurality of ventilation holes 41 therein. One side away from a pivot end of the first cover 40 defines a plurality of through slots 42 for extension of cables of connectors therethrough, and forms two catches 43. The through slots 42 may be serration-shaped for accommodating multiple cables. The first cover 40 defines an opening 44 that includes a narrow accommodating slot 45, and a large assembly slot 46. A slim connecting slot communicates the accommodating slot 45 and the assembly slot 46. The accommodating slot 45 is located aligning with an expansion-slot zone which has input/output electronic interfaces such as expansion cards. The accommodating slot 45 collects cables of the connectors that are connected to the electronic interfaces. There may be more than one accommodating slot 45 communicating with each other. The assemble slot 46 is offset from the expansion card slots. The assemble slot 46 is set to be relatively large because a connector connected to an expansion card sometimes may be large. The accommodating slot 45 is set to be relatively narrow because the connector connected to the expansion card is not allowed to be unscrewed and pulled out through the accommodating slot 45. Thus, the connector and its cable are permitted to be pulled out only when the first cover 40 is rotated outwardly. Three lugs 47 protrude outwardly from the first cover 40 at the pivot end thereof. Two locking holes 48 are defined in each lug 47.

The second cover 50 is substantially arc-shaped, and defines a plurality of ventilation holes 51. Three lugs 52 protrude outwardly from the pivot end of the second cover 50. Two protuberances 53 are formed at each lug 52. Two opposite sides of the end away from the pivot end of the second cover 50 each form a resilient tab 54. A knob 55 protrudes outwardly from the resilient tab 54.

Figure 4:
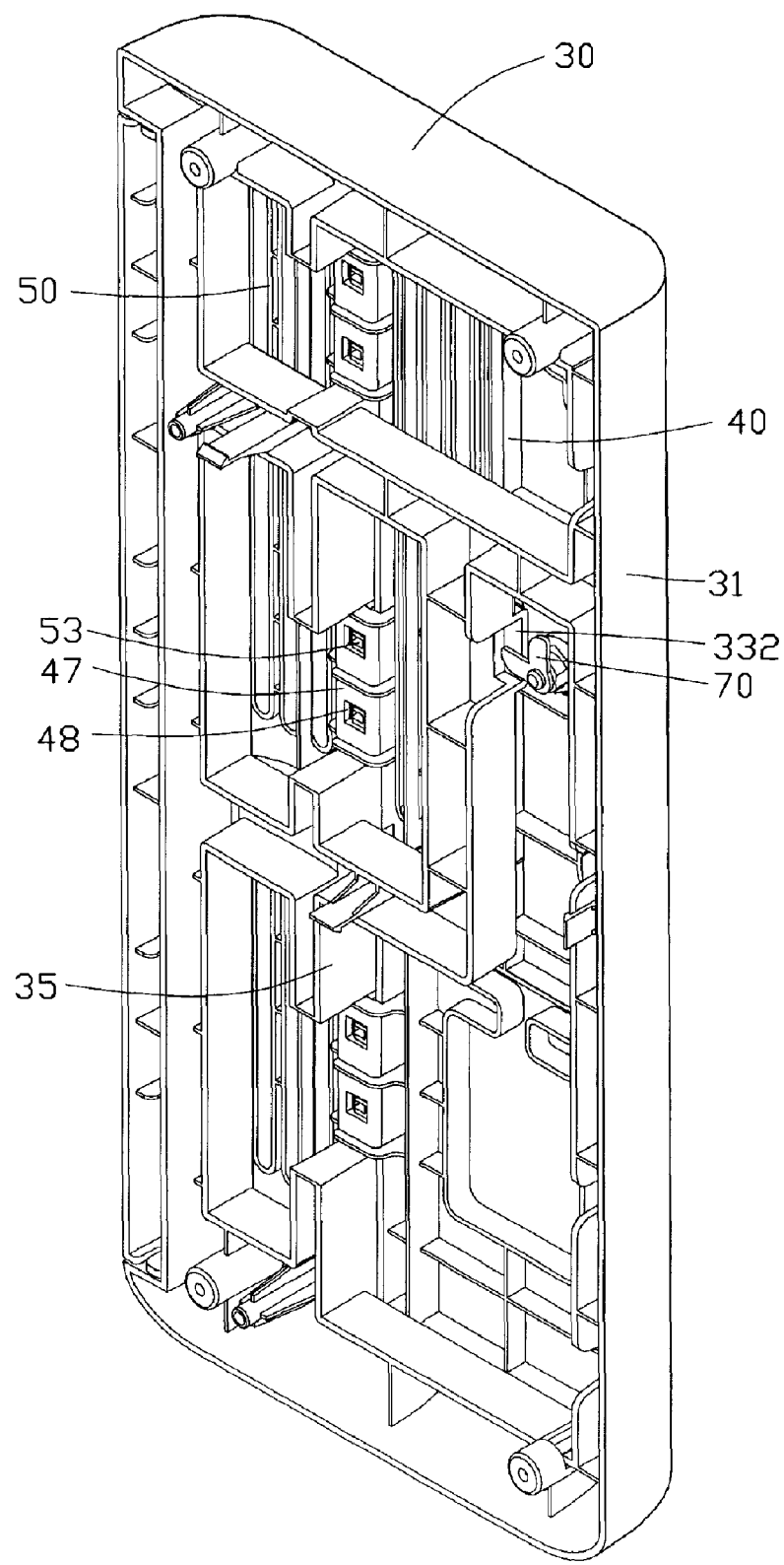
FIG. 4 is an assembled view of FIG. 2, showing a locked position.

Referring also to FIGS. 3 and 4, the first and second covers 40, 50 are respectively pivotally attached to the outer frame 31 at two opposite sides of the crossbeam 35. The side panel 14 is moved in a back-to-front direction to be attached to the computer chassis 10. The second cover 50 is firstly closed, and a free end thereof abuts against an edge of the side panel 14 to prevent the side panel 14 from withdrawal. The knobs 55 of the second cover 50 engage with indents (not shown) of inner sides of the arm portions 31 for locating the second cover temporarily. Meanwhile, the lugs 52 of the second cover 50 respectively abut against bottoms of the cutouts 352 of the crossbeam 35. After all connectors and their cables are extended through the first cover 40 to connect with the output/input interfaces of the rear panel 12 and the cables are collected in the accommodating slot 45, the first cover 40 is rotated into the larger region of the outer frame 30. Meanwhile, the lugs 47 are rotated outwardly, until the protuberances 53 of the lugs 52 of the second cover 50 respectively enter the locking holes 48 of the lugs 47 of the first cover 40. The catches 43 of the first cover 40 engage with the outer frame 31 of the bracket 30. Thus, the lugs 47 of the first cover 40 abut against the lugs 52 of the second cover 50 to prevent the second cover 50 from being rotated outwardly.

The first cover 40 defines a lock hole 49 for accommodating the lock 70 or other locking means therein. The lock 70 as shown in FIG. 2 includes a lock core 71 and a lever 73. When the first cover 40 is closed, a key is inserted in the lock core 71 and drives the lever 73 to rotate. When the lever 73 is engaged with the locking portion 332, the first cover 40 is secured in a locked position. The second cover 50 is also secured in a locked position by the first cover 40. It will prevent an unauthorized person from plugging or pulling out connectors, or from stealing data from a computer.

When opening the second cover 50 is needed, the first cover 40 must be opened firstly. The lock 70 is screwed with a key to release the first cover 40. The first cover 40 is rotated outwardly so that the lugs 47 leave the lugs 52, the second cover 50 is thereby capable of being rotated outwardly. The side panel 14 is then capable of being disassembled from the chassis 10 after the second cover 50 is rotated outwardly.

In this preferred embodiment, the second cover 50 is designed to be a separate part of the first cover 40, and rotated in a reverse direction of that of the first cover 40. This leaves the side panel 14 a withdrawal distance. If there is an integrated cover rotated at the side of the side panel 14, an undesired distance must be designed between the side panel and the cover for withdrawal of the side panel 14.

The second cover 50 can be opened only when the first cover 40 is opened. The side panel 14 can be disassembled only when the second cover 50 is opened. Thus, only one lock can control the two covers 40, 50 and the side panel 14.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A computer enclosure comprising:
    a side panel movably attached to a side of a computer chassis, and only detachable from the side along a direction perpendicularly toward a rear side of the computer chassis;
    a bracket arranged to a rear portion of the chassis, one side of the bracket defines a cutout for withdrawal of the side panel;
    a first cover pivotably attached to the bracket around a first axis, a free end of the first cover lockable to the bracket, a lug extending from the first cover, the lug and the free end of the first cover located at two opposite sides of the first axis; and
    a second cover pivotably attached to the bracket around a second axis, the first and second axes being adjacent to each other and parallel with a rear end of the side panel, a free end of the second cover blocking the rear end of the side panel from rearward movement when the second cover is closed, a lug extending from the second cover, the lug and the free end of the second cover located at two opposite sides of the second axis;
    wherein the lug of the second cover is placed on an outer side of the lug of the first cover, such that the first cover must be opened first to open the second cover.

2. The computer enclosure as claimed in claim 1, wherein the bracket comprises two opposite arm portions, two opposite ends of the first axis respectively engage with the two arm portions, and two opposite ends of the second axis respectively engage with the two arm portions.

3. The computer enclosure as claimed in claim 2, wherein a crossbeam connects the arm portions and is located between the first and second axes, when the first and second covers are closed, the lug of the second cover is sandwiched between the lug of the first cover and the crossbeam.

* * * * *